United States Patent
Gibbons et al.

(10) Patent No.: US 8,184,554 B2
(45) Date of Patent: May 22, 2012

(54) METHOD AND APPARATUS FOR PROVIDING A ROUTING REGISTRY

(75) Inventors: John F. Gibbons, Ballston Lake, NY (US); Michael Satterlee, Clifton Park, NY (US); Neal A. Shackleton, Tierra Verde, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 169 days.

(21) Appl. No.: 12/184,040

(22) Filed: Jul. 31, 2008

(65) Prior Publication Data

US 2010/0027546 A1    Feb. 4, 2010

(51) Int. Cl.
*H04L 12/28* (2006.01)

(52) U.S. Cl. .................................. 370/254; 370/401

(58) Field of Classification Search .................. None
See application file for complete search history.

(56) References Cited

U.S. PATENT DOCUMENTS

| | | | |
|---|---|---|---|
| 2005/0089015 A1* | 4/2005 | Tsuge et al. | 370/351 |
| 2006/0029035 A1* | 2/2006 | Chase et al. | 370/351 |
| 2007/0223486 A1* | 9/2007 | Farid et al. | 370/395.2 |
| 2007/0250612 A1* | 10/2007 | Elias et al. | 709/223 |
| 2008/0069133 A1* | 3/2008 | Yong et al. | 370/443 |
| 2008/0080509 A1* | 4/2008 | Khanna et al. | 370/392 |

* cited by examiner

*Primary Examiner* — Kevin C Harper

(57) ABSTRACT

A method and apparatus for processing a route update in a network are disclosed. For example, the method receives at least one route update from a customer edge (CE) device by a centralized routing registry. The method identifies at least one interface of a provider edge (PE) device associated with the CE device, and forwards the at least one route update to the at least one interface of the provider edge (PE) device.

16 Claims, 4 Drawing Sheets

METHOD AND APPARATUS FOR PROVIDING A ROUTING REGISTRY

The present invention relates generally to communications networks and, more particularly, to a method and apparatus for providing a routing registry for a packet network, e.g., a Virtual Private Network (VPN), an Internet Protocol (IP) network, and so on.

BACKGROUND OF THE INVENTION

In Internet Protocol (IP) based networks, routers require IP route prefixes to be loaded in their routing tables to determine where to route incoming packets. The routing tables are populated either by hard-coding static routes or by announcing routes using a dynamic routing protocol, e.g., Border Gateway Protocol (BGP). Static routes are inflexible in that routing modifications require a complex process involving customer and service provider resources. Dynamic routing provides the flexibility for route modifications, but this approach consumes processing resources on the service provider's network. For example, the service provider may wish to use a provider edge router for enabling one thousand customers to its network. However, the provider edge router may have enough routing capacity to handle the traffic from the thousand customers but it may not have sufficient resources to establish BGP connectivity with all one thousand customers for the purpose of providing dynamic routing updates.

SUMMARY OF THE INVENTION

In one embodiment, the present invention discloses a method and apparatus for processing a route update in a network. For example, the method receives at least one route update from a customer edge (CE) device by a centralized routing registry. The method identifies at least one interface of a provider edge (PE) device associated with the CE device, and forwards the at least one route update to the at least one interface of the provider edge (PE) device.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention provides a routing registry for a packet network, e.g., a Virtual Private Network (VPN), an Internet Protocol (IP) network, and so on.

Figure 1:
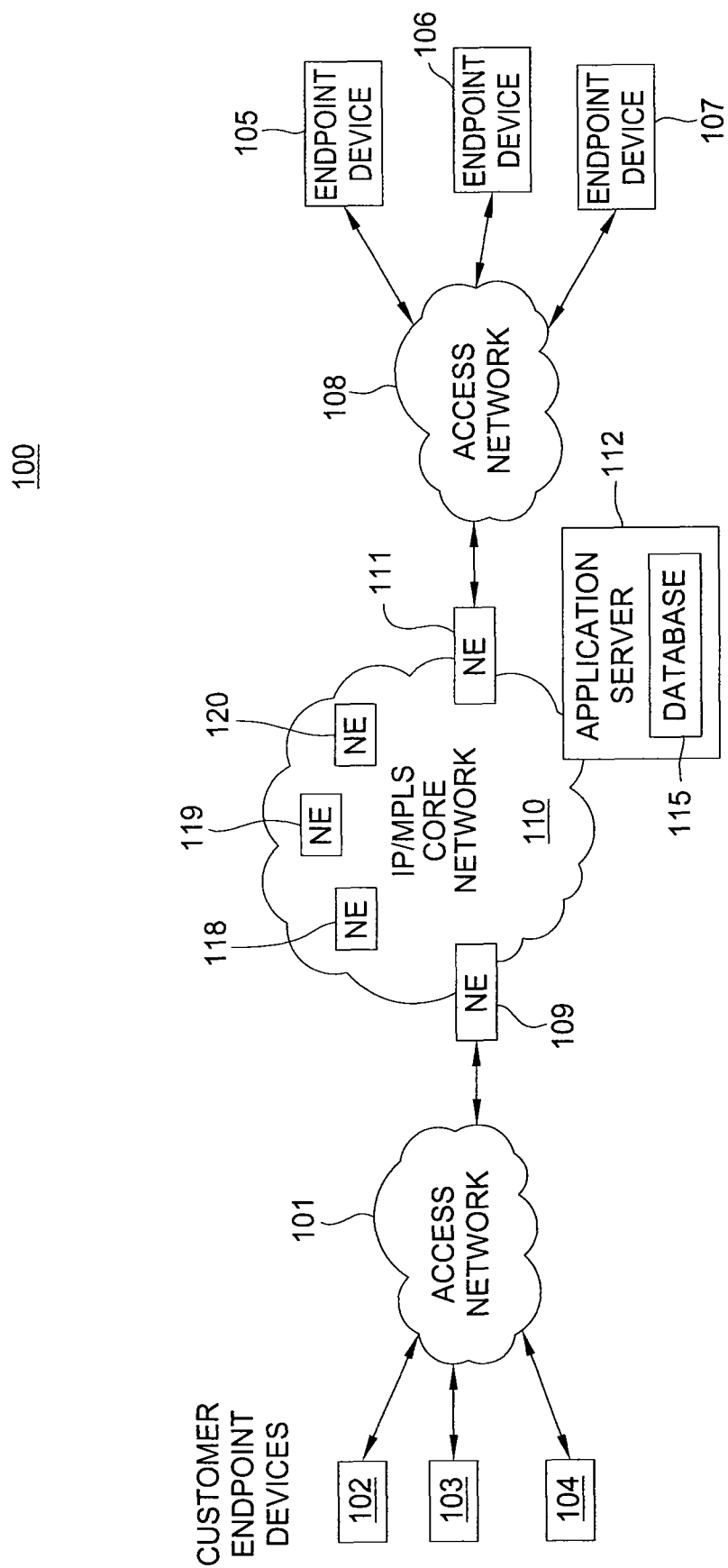
FIG. 1 illustrates an exemplary network of the current invention for providing a routing registry for a network.

FIG. 1 illustrates an illustrative packet network 100 related to the current invention. Exemplary packet networks include Internet protocol (IP) networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), Private Line, Frame Relay, and ATM, and the like.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements, one application server and so on are depicted in FIG. 1, the packet network 100 may be expanded by including additional endpoint devices, access networks, network elements, application servers, etc. without altering the present invention.

The above IP network is described to provide an illustrative environment in which packets for voice and data services are transmitted on networks. However, it should be noted that the present invention is not limited to a particular type of packet network.

In one embodiment, the current invention discloses a method and apparatus for providing a routing registry for a network for handling routing updates. In order to clearly illustrate the teachings of the current invention, the following terminologies and networking concepts will first be described:

Virtual Private Network (VPN);
Customer Edge (CE);
Provider Edge (PE); and
Border Gateway Protocol (BGP).

Virtual Private Network (VPN) is a private network that uses a public network to interconnect multiple sites and users. VPN uses virtual connections routed through the public network to connect remote sites, mobile users, corporate LANs, and the like. For example, a VPN may have a LAN at a corporation's main office, remote LANs at branch offices and individual employees connecting to the corporate LANs via mobile devices, and the like. The public network may be the Internet or a network of a service provider.

Customer Edge (CE) device refers to a device located at a customer location and communicates with a provider edge device as defined below via a data link. A customer edge device may be a router or a switch. The CE is located at the edge of a customer network. Thus, a customer edge router is a routing peer to a provider edge device to which it communicates with. For example, the customer edge device may communicate with the provider edge device using Border Gateway Protocol (BGP) as described below.

Provider Edge (PE) device refers to a router or a switch administered by a network service provider and used to communicate with customer edge devices. The PE is located at the edge of a service provider network.

Border Gateway Protocol (BGP) refers to a protocol designed to pass routing information between systems operated by different administrators. For example, BGP allows attributes of routes to be passed between network elements.

It should be noted that although the present invention uses BGP to describe the present invention, the present invention is not so limited. Namely, any other communication protocols that can be used to pass routing information between network elements can be adapted to the present invention.

Routes between two locations are established by creating network topologies. The routers in networks are capable of maintaining their own routing and forwarding tables. If the service provider wishes to make sure a specific route is used, the service provider defines a static route. Otherwise, each router dynamically determines and stores the routes to various destinations (prefixes) in its routing table. For example, the algorithms for dynamic routing are generally designed to find the shortest route.

For example, a service provider with an IP backbone network may provide VPN services to enterprise customers. Each enterprise location may have one or more customer edge routers communicating with one or more provider edge routers. PEs and CEs use IP routing prefixes loaded in their respective routing tables to determine where to route incoming packets. However, as discussed above, dynamic routing protocols (e.g., such as BGP) consume PE processing resources, thereby limiting the number of CEs that a PE is able to support.

In one embodiment, the current invention provides a centralized routing registry. The method enables the CEs to dynamically populate their routing tables while reducing the processing load on the PEs, thereby increasing the routing capacity of the network.

Figure 2:
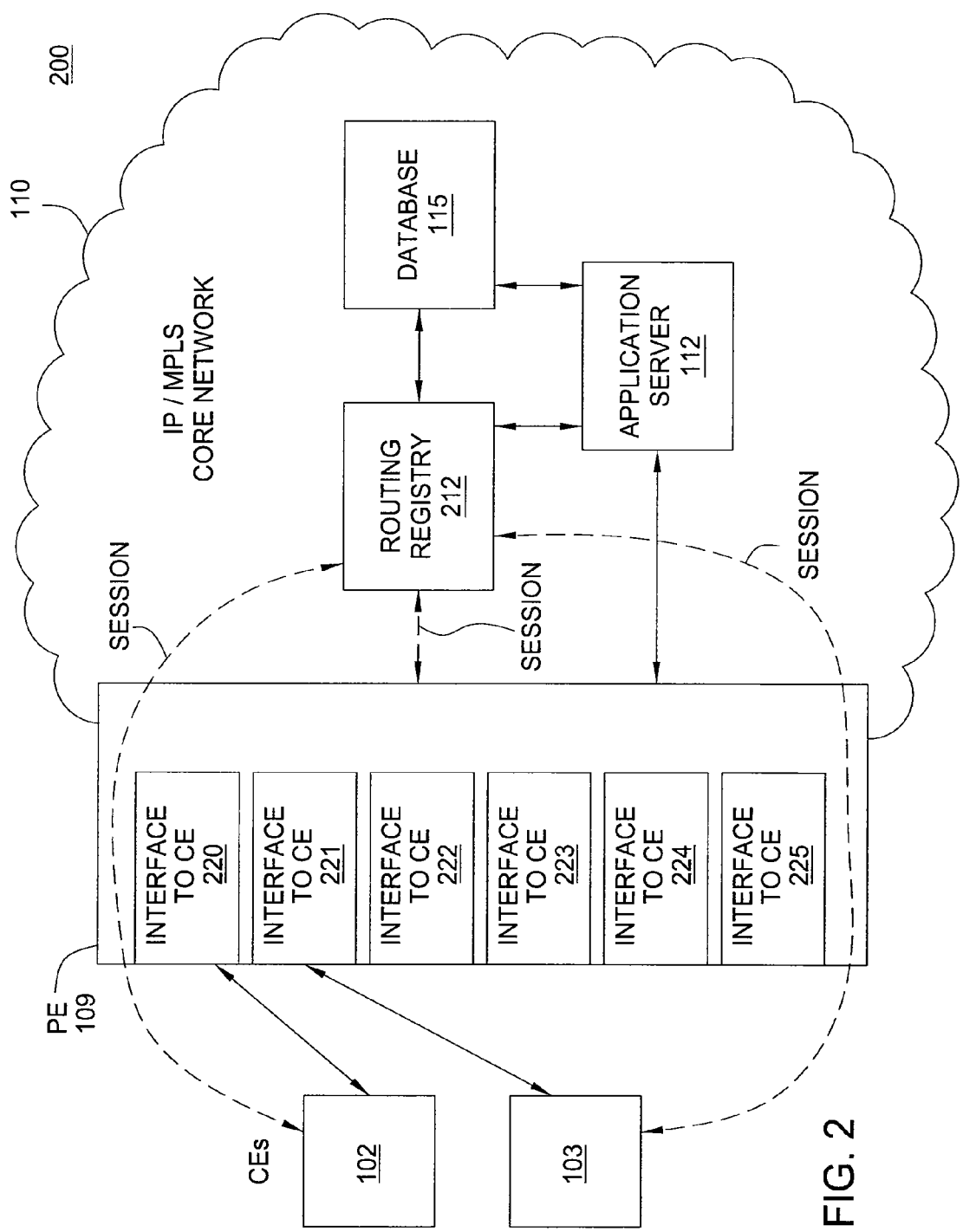
FIG. 2 illustrates an illustrative network with the current invention for providing a routing registry.

FIG. 2 illustrates an illustrative network 200 with the current invention for providing a centralized routing registry. For example, the CEs 102 and 103 are accessing services from the IP/MPLS core network 110 via PE 109. PE 109 has interfaces 220-225 for providing BGP sessions to various CEs. The IP/MPLS core network 110 also contains a database 115 and a routing registry 212. The routing registry can be implemented via a dedicated application server or on an existing application server that is capable of performing other network functions in addition to the processing of routing updates as discussed below. In one embodiment, the service provider implements the current invention by using the routing registry 212 and database 115. The service provider also utilizes an application server 112 to assign unique identifications to CEs and PE interfaces.

The method first assigns one or more unique identifications to each CE and to each interface on each PE. For example, application server 112 may assign unique identifications to CEs 102 and 103, and unique identification to each of the PE interfaces 220-225. In other words, each physical and logical interface of each PE, is assigned a unique identification. However, each CE may be assigned a unique identification. For example, in order for the CE to attach to the associated PE interface, it must be configured with the same interface identifier. The PE has the unique ID for the interface which it will provide to the customer. This unique ID can only be used for a CE that connects to that interface on the PE, such that if another customer tried to use the ID on their port, it would be rejected.

The method may then pre-populate the routing registry 212 with pairs of identifications of a CE and a particular PE interface. For example, for each of the CEs 102 and 103, the service provider may assign at least one of the PE interfaces on PE 109. For example, CE 102 may be paired with PE interface 220 and CE 103 may be paired with PE interface 221. The identifications of the CE and PE interface associated with said PE may then be stored in the routing registry. For example, the application server 112 may store the pairs of CE and PE interfaces in the routing registry 212.

In one embodiment, the method then establishes a signaling session, e.g., a single peering session (e.g., a BGP session) between each CE and a routing registry. The method also establishes a signaling session between each PE and the routing registry. For example, signaling sessions may be established between: CE 102 and routing registry 212; CE 103 and routing registry 212; and PE 109 and routing registry 212. The routing session between the routing registry and the PE will be enabled at startup of the registry and be used to communicate reachability for each PE/CE pair.

In operation, if a customer wishes to invoke a session with the service provider's network, a CE of the customer will communicate with a PE of the service provider's network. During the initial link setup, the PE advertises its interface identification for the link to the CE. Once the link is active, the CE establishes a signaling session to the routing registry.

In one embodiment, the present invention must first authenticate the CE before allowing the CE to establish a signaling session with the routing registry. For example, an authentication may be performed to ensure that the CE is authorized for a particular PE interface. For example, the routing registry may first authenticate CE 102's identity prior to allowing CE 102 to have a session with the routing registry. If the authentication is successful, the CE may then send a pair of identifications wherein the pair comprises: the CE's identification and the identification of the PE interface for the CE's link. It should be noted that various authentication protocols can be used such MD-5 and the like.

The routing registry may then determine whether or not the received pair of identifications matches a pair of identification in the routing registry's database 115 that was pre-populated. If the pair of identifications matches the database, the CE may then advertise its route prefixes to the routing registry. For example, CE 102 may wish to make one or more modifications to its route prefixes. CE 102 may then provide the modifications to the routing registry 212. In turn, the routing registry may then advertise the route prefixes to the associated PE with the PE interface identification.

The PE that receives the route prefixes from the routing registry may create the routes for the prefixes pointing to the associated PE interface, e.g., using the PE interface identification to identify the correct interface. For example, a PE may have an interface identified as interface number 220 paired with a specific CE, e.g., CE 102. When the PE receives the route prefixes from the routing registry for CE 102, the PE creates routes for the prefixes pointing to the interface number 220.

A CE may then add, remove or modify any of the route prefixes by communicating one or more changes to the routing registry during a signaling session, e.g., a BGP session. In turn, the routing registry may advertise the changes to the pertinent PE. For example, a routing registry may signal to the PE to remove one or more routing prefixes. When the connectivity between the PE and the CE is lost, the PE may then remove the prefixes from its routing table. This last step should occur when the interface goes down.

Thus, the present invention allows the CE to advertise any route updates (e.g., new routes, modified routes, removed or deleted routes, and the like) directly to the routing registry instead of the PE that is paired with the CE. This allows dynamic routing to be implemented by the CE without significantly impacting the processing of the PE.

In one embodiment, as discussed above a signaling session is created for each CE-PE interface pair. However, the present invention is not so limited. For example, a CE may also have a plurality of interfaces as well, where the CE's plurality of interfaces is capable of providing BGP routing capability. In this example, a particular interface on the CE may then be paired with a particular interface on a PE, i.e., to form a CE interface—PE interface pair.

Figure 3:
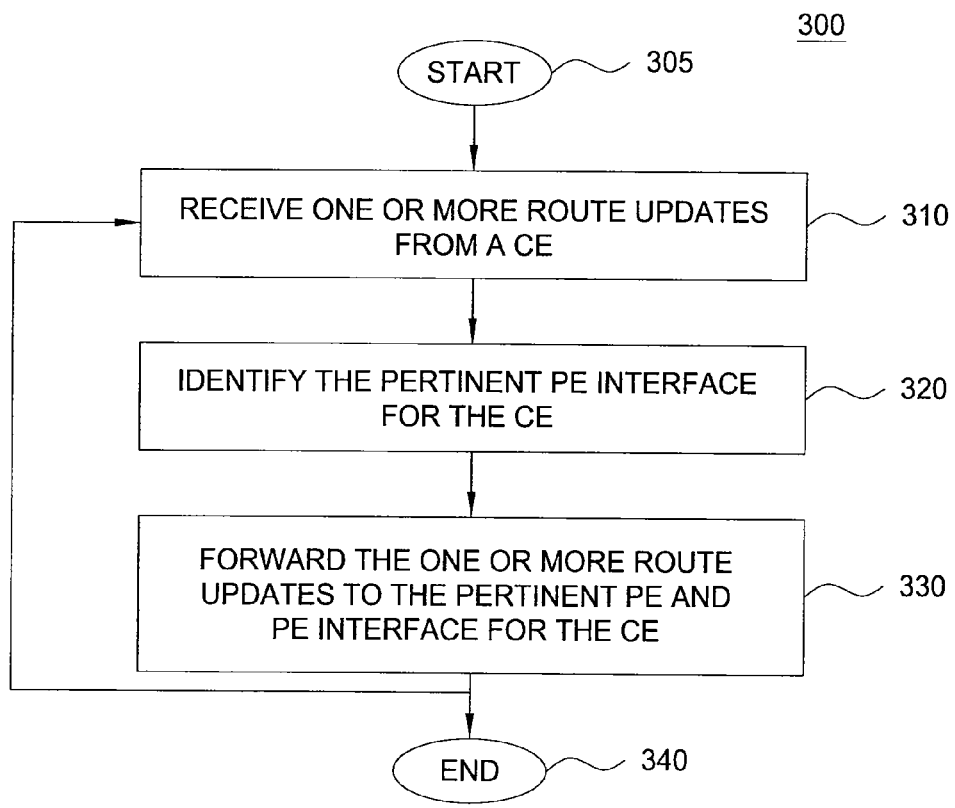
FIG. 3 illustrates a flowchart of a method for using a routing registry of the current invention.

FIG. 3 illustrates a flowchart of a method 300 for using a routing registry of the current invention. For example, method 300 can be implemented by the routing registry of the current invention. Method 300 starts in step 305 and proceeds to step 310.

In step 310, method 300 receives one or more route updates from a CE. For example, a routing registry receives one or more add, remove or modify route changes from the CE.

In step 320, method 300 identifies the pertinent PE and PE interface for the CE. For example, the routing registry retrieves the identification of the PE interface from its database. For example, the routing registry retrieves the identification of the pertinent PE interface via a look-up operation in the database containing pairs of identifications of CEs (or CE interfaces) and their associated PE interfaces.

In step 330, method 300 forwards the one or more route updates to the pertinent PE and PE interface for the CE. For the example above, the method forwards the received one or more add, remove, or modify route changes to the PE identified in step 320. The method then ends in step 340 or returns to step 310 to continue receiving new updates.

In turn, the PE receives the route changes and shares the changes with its BGP peers (e.g., one or more other network elements) that are pointing to the PE interface identified in step 320. In this manner, the routing registry allows the customer to use dynamic routing protocol, but PEs receive route updates from signaling sessions with the routing registry instead of the CE. Since the route updates are received from the routing registry instead of a multitude of CEs, a PE's session connectivity capability would not be exceeded.

Figure 4:
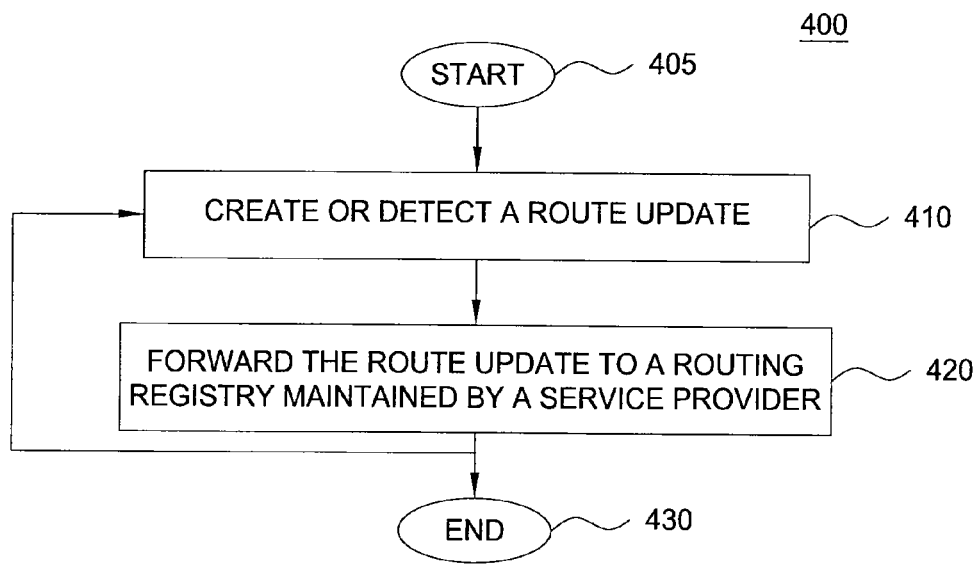
FIG. 4 illustrates a flowchart of a method for a CE for interacting with a routing registry of the current invention.

FIG. 4 illustrates a flowchart of a method for a CE for interacting with a routing registry of the current invention. For example, method 400 can be implemented by a CE. Method 400 starts in step 405 and proceeds to step 410.

In step 410, method 400 creates or detects a route update. For example, a CE detects an addition or deletion of a route prefix. In another example, a route prefix may be modified.

In step 420, method 400 forwards the route update to a routing registry maintained by a service provider. Namely, the CE is directly communicating with the routing registry via a BGP session established with the routing registry. Note that the PE router is not used to make the routing announcements but may be used for forwarding packets (in a similar capacity as other routers in the network) between the routing registry and the CE. The method then ends in step 430 or returns to step 410 to continue detecting new route updates.

It should be noted that although not specifically specified, one or more steps of methods 300 and 400 may include a storing, displaying and/or outputting step as required for a particular application. In other words, any data, records, fields, and/or intermediate results discussed in the methods 300 and 400 can be stored, displayed and/or outputted to another device as required for a particular application. Furthermore, steps or blocks in FIG. 3 or FIG. 4 that recite a determining operation, or involve a decision, do not necessarily require that both branches of the determining operation be practiced. In other words, one of the branches of the determining operation can be deemed as an optional step.

Figure 5:
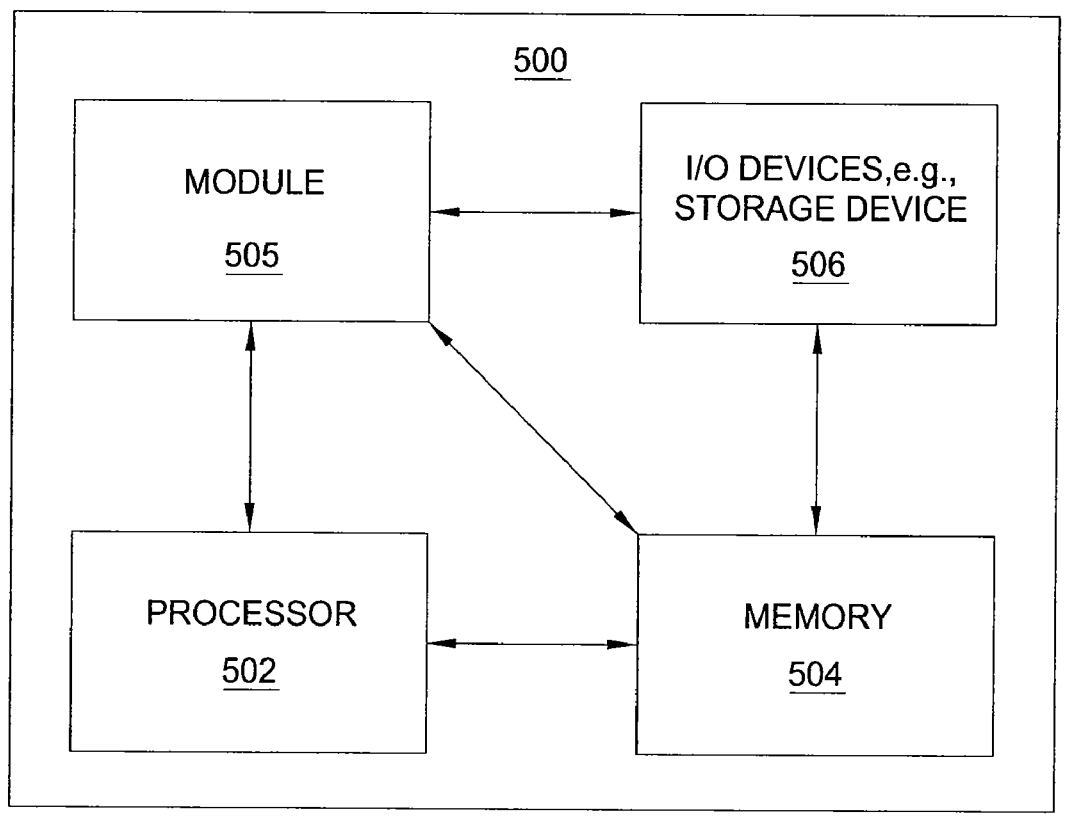
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a routing registry for a network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing a routing registry for a network can be loaded into memory 504 and executed by processor 502 to implement the functions as discussed above. As such, the present process 505 for providing a routing registry for a network (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a route update in a network, comprising;
   receiving a route update from a customer edge device by a centralized routing registry in the network, wherein the route update is received over a signaling session established between the customer edge device and the centralized routing registry;
   identifying an interface of a provider edge device in the network associated with the customer edge device; and
   forwarding the route update to the interface of the provider edge device by the centralized routing registry, wherein, after the forwarding, the provider edge device distributes the route update to a peer pointing to the interface of the provider edge device.

2. The method of claim 1, wherein the customer edge device comprises a customer edge router, and wherein the provider edge device comprises a provider edge router.

3. The method of claim 1, wherein the route update comprises a route modification.

4. The method of claim 1, wherein the route update comprises an identification of the customer edge device and an identification of the interface of the provider edge device.

5. A method for processing a route update in a network, comprising:
    receiving a route update from a customer edge device by a centralized routing registry in the network, wherein the route update is received over a signaling session established between the customer edge device and the centralized routing registry, wherein the route update comprises an identification of the customer edge device and an identification of an interface of a provider edge device;
    identifying the interface of the provider edge device in the network associated with the customer edge device, wherein the identifying comprises comparing the identification of the customer edge device and the identification of the interface of the provider edge device with a list of pairs of identifications stored in a database; and
    forwarding the route update to the interface of the provider edge device by the centralized routing registry.

6. The method of claim 5, wherein the list of pairs of identifications is maintained by a service provider of the network.

7. The method of claim 1, wherein the route update is received by the centralized routing registry via a dynamic routing protocol.

8. The method of claim 7, wherein the dynamic routing protocol is a border gateway protocol.

9. The method of claim 1, wherein the route update is forwarded to the interface of the provider edge device via a dynamic routing protocol.

10. The method of claim 9, wherein the dynamic routing protocol is a border gateway protocol.

11. A non-transitory computer-readable medium having stored thereon a plurality of instructions, the plurality of instructions including instructions which, when executed by a processor, cause the processor to perform a method for processing a route update in a network, comprising:
    receiving a route update from a customer edge device by a centralized routing registry in the network, wherein the route update is received over a signaling session established between the customer edge device and the centralized routing registry;
    identifying an interface of a provider edge device in the network associated with the customer edge device; and
    forwarding the route update to the interface of the provider edge device, wherein, after the forwarding, the provider edge device distributes the route update to a peer pointing to the interface of the provider edge device.

12. The non-transitory computer-readable medium of claim 11, wherein the customer edge device comprises a customer edge router, and wherein the provider edge device comprises a provider edge router.

13. The non-transitory computer-readable medium of claim 11, wherein the route update comprises a route modification.

14. The non-transitory computer-readable medium of claim 11, wherein the route update comprises an identification of the customer edge device and an identification of the interface of the provider edge device.

15. A non-transitory computer-readable medium having stored thereon a plurality of instructions, the plurality of instructions including instructions which, when executed by a processor, cause the processor to perform a method for processing a route update in a network, comprising:
    receiving a route update from a customer edge device by a centralized routing registry in the network, wherein the route update is received over a signaling session established between the customer edge device and the centralized routing registry, wherein the route update comprises an identification of the customer edge device and an identification of an interface of a provider edge device;
    identifying the interface of the provider edge device in the network associated with the customer edge device, wherein the identifying comprises comparing the identification of the customer edge device and the identification of the interface of the provider edge device with a list of pairs of identifications stored in a database; and
    forwarding the route update to the interface of the provider edge device.

16. The non-transitory computer-readable medium of claim 11, wherein the route update is received by the centralized routing registry via a dynamic routing protocol, and wherein the route update is forwarded to the interface of the provider edge device via the dynamic routing protocol.

* * * * *